United States Patent [19]

Suzuki et al.

[11] Patent Number: 5,694,415
[45] Date of Patent: Dec. 2, 1997

[54] SIGNAL COMMUNICATION SYSTEM CAPABLE OF RECOGNIZING RECEPTION OF RECEPTION DESIRED SIGNAL

[75] Inventors: Mitsuhiro Suzuki, Chiba; Makoto Natori, Saitama, both of Japan

[73] Assignee: Sony Corporation, Tokyo, Japan

[21] Appl. No.: 557,298

[22] Filed: Nov. 14, 1995

[30] Foreign Application Priority Data

Nov. 15, 1994 [JP] Japan .................. P06-280862

[51] Int. Cl.$^6$ .................. H04B 15/00
[52] U.S. Cl. .................. 375/200; 375/208
[58] Field of Search .................. 375/200, 208, 375/332, 367, 273; 342/386; 370/441; 332/103

[56] References Cited

U.S. PATENT DOCUMENTS

| 4,481,640 | 11/1984 | Chow et al. | 375/200 |
| 4,941,150 | 7/1990 | Iwasaki | 375/200 |
| 4,977,578 | 12/1990 | Ishigaki et al. | 375/200 |

*Primary Examiner*—Stephen Chin
*Assistant Examiner*—Joseph Roundtree
*Attorney, Agent, or Firm*—Jay H. Maioli

[57] ABSTRACT

An input information signal is phase-modulated in a DQPSK (differentially encoded quadrature phase shift keying) modulation system. The resultant modulated signal is supplied to an input terminal of a first multiplier. A first M-bit random number generator receives transmission timing data and initial value data from a first initial value generator and generates an M-bit random numbers beginning at the initial value data. A first phase generator generates phase data corresponding to the random number and supplies the phase data to the other input terminal of the first multiplier. A first multiplier generates a first multiplied signal by multiplying the modulated signal from the phase modulator and the phase data from the first phase generator. The first multiplied signal is transmitted through a wireless or wire transmission path. A reception signal from the transmission path is supplied to one input terminal of a second multiplier. A second M-bit random number generator, a second initial value generator and a second phase generator are the same as the first M-bit random number generator, the first initial value generator and the first phase generator in configuration. The second phase generator supplies the same phase data as that of the first phase generator to the other input terminal of the second multiplier. The second multiplier generates a second multiplied signal by multiplying the reception signal and the phase data from the second phase generator. The second multiplied signal is supplied to a phase demodulator and/or phase judgement circuit.

8 Claims, 3 Drawing Sheets

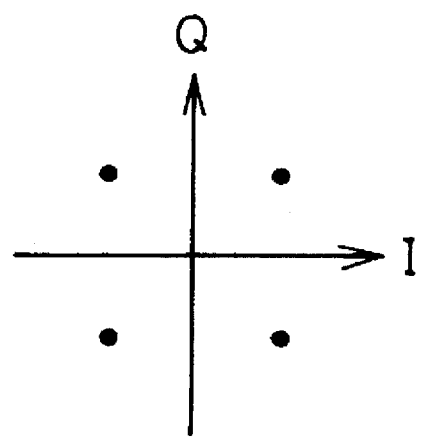
F I G. 2A
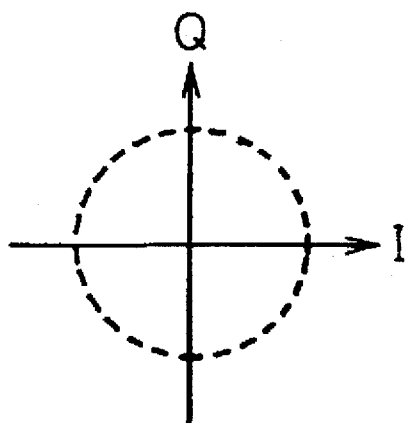
F I G. 2B

SIGNAL COMMUNICATION SYSTEM CAPABLE OF RECOGNIZING RECEPTION OF RECEPTION DESIRED SIGNAL

BACKGROUND OF THE INVENTION

1. Field of the Invention

The present invention relates to a signal communication method suitable for communicating with a specified communication unit in a radiotelephone communication system.

2. Description of the Related Art

When a wireless signal (desired signal) transmitted from a first station is received at a second station like a radiotelephone system, the second station determines whether a reception wave is a desired wave or not.

To determine whether the reception wave is the desired wave or not, inherent identification (ID) codes of predetermined bits for discriminating respective stations are added to radio signals transmitted from respective stations. After the reception wave is demodulated at the receiving station, transmission data is decoded and the identification code contained in the decoded data is detected. If the detected identification code is agreed with an identification code that is searched by the second station, then it is determined that the reception wave is the desired wave.

This identification code is referred to as a color code and is located at a predetermined position (e.g., substantially at the center of each transmission slot) of one slot which is a unit of a signal transmitted from each station.

When it is determined by detecting the identification code added to transmission information on the reception side whether or not the reception wave is the desired wave, the reception wave is demodulated, a demodulated signal is decoded and decoded data is identified. Accordingly, many circuits are required in the process for determining whether or not the reception signal is the desired wave. Furthermore, all circuits should be operated until the reception signal is decoded. Also, it takes much time to determine after the signal is received whether or not the reception signal is the desired wave.

SUMMARY OF THE INVENTION

In view of the aforesaid aspect, it is an object of the present invention to provide a communication system in which it can be determined without decoding received data whether or not received data is a desired wave.

According to the present invention, an input information signal is phase-modulated in a DQPSK (differentially encoded quadrature phase shift keying) modulation system. A resultant modulated signal is supplied to one input terminal of a first multiplier. A first M-bit random number generator receives transmission timing data and initial value data from a first initial value generator and generates an M-bit random number from the initial value data. A first phase generator generates phase data corresponding to the random number and supplies the phase data to the other input terminal of the first multiplier. The first multiplier generates a first multiplied signal by multiplying the modulated signal from the phase modulator and the phase data from the first phase generator. The first multiplied signal is transmitted through a wireless or wire transmission path. A reception signal from the transmission path is supplied to one input terminal of a second multiplier. A second M-bit random number generator, a second initial value generator and a second phase generator are the same as the first M-bit random number generator, the first initial value generator and the first phase generator in configuration. The second phase generator supplies the same phase data as that of the first phase generator to the other input terminal of the second multiplier. The second multiplier generates a second multiplied signal by multiplying the reception signal and the phase data from the second phase generator. The second multiplied signal is supplied to a phase demodulator and to a phase judgement circuit.

Further, a transmission signal is differentially modulated by a third multiplier and a first delay circuit and then transmitted. A reception signal is differentially demodulated by a fourth multiplier and a second delay circuit and then multiplied with phase data.

According to the present invention, the modulated signal is multiplied with the phase data generated in response to the already-known random number at a predetermined timing. Then, the reception signal is multiplied with the phase data generated based on the already-known random number at the same timing as the predetermined timing and then demodulated. Therefore, if the random number used in the transmission side is equal to the random number used in the reception side, or if the desired wave is received, then transmitted information is demodulated and decoded correctly.

In this case, the phase modulation is carried out as a modulation in order to obtain a transmission signal and a phase demodulation is carried out as a demodulation for demodulating a reception signal, whereby a transmission signal to be transmitted is phase-shifted by multiplying phase data based on the random number and also phase-shifted by modulation. Accordingly, the modulated wave is scrambled by phase shift carried out by modulating the phase data based on the random number. Other signal waves different than the desired signal wave become meaningless information by multiplying phase data based on the random number. Therefore, it is recognized that the reception signal is not the desired signal wave.

Further, When the phase of the signal which results from phase-demodulating the multiplied signal on the reception side is located at a predetermined phase position, it is judged that the desired wave is received. Therefore, it becomes possible to determine by judging the phase of the modulated signal whether or not a desired wave is received.

Furthermore, the multiplied signal is differentially modulated upon transmission and the reception signal is differentially demodulated upon reception, whereby the transmission signal multiplied with the phase data based on the random number can be transmitted satisfactorily as the differential signal.

BRIEF DESCRIPTION OF THE DRAWINGS

FIG. 2A is a diagram used to explain a phase of a reception signal obtained when a desired wave is received;

FIG. 2B is a diagram used to explain a phase of a reception signal obtained when a wave other than the desired wave is received.

DETAILED DESCRIPTION OF THE PREFERRED EMBODIMENTS

A signal communication system according to an embodiment of the present invention will hereinafter be described with reference to FIG. 1 and FIGS. 2A, 2B.

Figure 1:
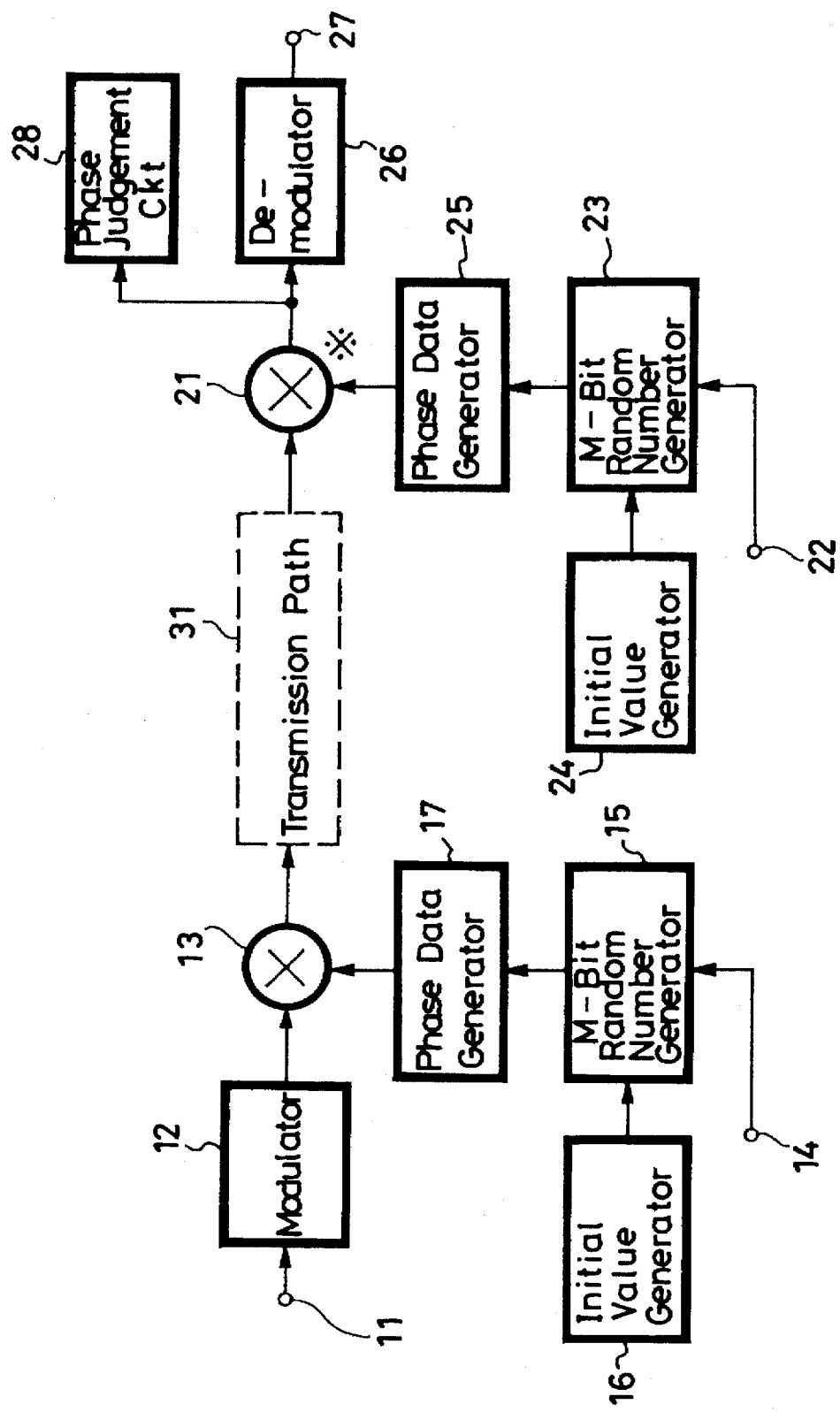
FIG. 1 is a block diagram showing a signal communication system according to a first embodiment of the present invention.

FIG. 1 shows in block form a signal communication system according to the present invention which is adopted to a communication system in which a DQPSK (differentially encoded quadrature phase shift keying) modulated signal is transmitted via radio waves.

As shown in FIG. 1, an information bit string to be transmitted is supplied through an input terminal 11 to a modulator 12. The modulator 12 modulates data in a DQPSK fashion. The modulator 12 separates information bit string supplied thereto into two series data of I series and Q series and modulates data by quadrature modulation of two series of data. The phase-modulated signal is a complex wave signal indicative of any phase of four values shifted by 90 degrees on the coordinates formed when the I component and the Q component fall at right angles each other. A modulated output of the modulator 12 is supplied to one input terminal of a multiplier 13.

Transmission timing data (data of one symbol clock) indicative of transmission timing supplied from a transmission control unit (not shown) on the transmission side is supplied through an input terminal 14 to an M-bit random number generator 15.

The M-bit random number generator 15 is arranged as an M-series generator composed of a shift register and an exclusive-OR gate. Data of initial value of a predetermined bit number (e.g., 8 bits) is supplied from an initial value generator 16 to the M-bit random number generator 15. The M-bit random number generator 15 generates M-bit random numbers beginning at the initial value supplied thereto in synchronism with transmission timing data. Data (identification code, etc.) individually prepared for every communication system can be used as the initial value generated from the initial value generator 16.

A phase data generator 17 is composed of a read-only memory (ROM) table. The phase data generator 17 generates $2^M$ (e.g., 16) phase data (data of complex phase) corresponding to M-bit random numbers supplied thereto from the M-bit random number generator 15. Assuming that $\{a_0, a_1, \ldots, a_{M-1}\}$ is the M-bit random number output from the M-bit random number generator 15. Then, a complex phase composed of I component ($PS_I$) and Q component ($PS_Q$) output from the phase data generator 17 is expressed by the following equation:

$$PS_I = \cos\left(2\pi \times \sum_{n=0}^{M-1} 2^n a_n / 2^M\right) \quad (1)$$

$$PS_Q = \sin\left(2\pi \times \sum_{n=0}^{M-1} 2^n a_n / 2^M\right)$$

Phase data generated based on the already-known M-series random number is supplied to the multiplier 13, in which it is multiplied with the modulated output from the modulator 12. Since both signals are the complex signals, they are multiplied with each other in the form of complex number. The multiplied signal is transmitted to a predetermined transmission path 31 (via radio waves). When above multiplied signal is transmitted as a baseband signal, the above multiplied signal is transmitted to the transmission path 31 as it is. In this case, the multiplied signal is generally frequency-converted into a predetermined transmission frequency and then transmitted to the transmission line 31 in a wireless (or wire) fashion.

A reception system for receiving the signal transmitted through the transmission path will be described. A reception signal transmitted through the transmission path 31 is frequency-converted into the baseband signal and then supplied to an input terminal of a multiplier 21.

Data (one symbol clock data) indicating a reception timing from a communication control unit (not shown) on the reception side is supplied through an input terminal 22 to an M-bit random number generator 23. The M-bit random number generator 23 is supplied with data of initial value of a predetermined bit number (e.g., 8 bits) from an initial value generator 24. The M-bit random number generator 23 generates an M-bit random numbers beginning at the initial value supplied thereto from the initial value generator 24 in synchronism with transmission timing data. The M-bit random number output from the M-bit random number generator 23 is supplied to a phase data generator 25. The phase data generator 25 generates $2^M$ phase data (complex phase data) corresponding to the M-bit random numbers supplied thereto from the M-bit random number generator 23. The phase data thus generated from the phase data generator 25 is supplied to the other input terminal of a multiplier 21, in which it is multiplied with a reception signal supplied to one input terminal of the multiplier 21.

The M-bit random number generator 23, the initial value generator 24 and the phase data generator 25 on the reception side are the same as the M-bit random number generator 15, the initial value generator 16 and the phase data generator 17 on the transmission side so that the random numbers and the initial values thus generated also are the same. Therefore, the phase data generator 17 on the transmission side and the phase data generator 25 on the reception side generate the same phase data. The reception timing data supplied to the terminal 22 is synchronized with the transmission timing data by detecting a synchronizing component from a transmission signal.

The multiplier 21 multiplies the phase data generated from the phase data generator 25 and the reception signal in a complex conjugate multiplication fashion. Therefore, if the reception signal is a signal multiplied with the same phase data on the transmission side, i.e., a desired wave, the phase data multiplied on the transmission side is canceled.

The reception signal, processed in a complex conjugate multiplication fashion, is supplied to a demodulator 26 which demodulates the DQPSK transmission signal. A demodulated signal is supplied from a reception information bit output terminal 27 to a succeeding reception information processor (not shown).

If the reception signal is the desired wave, then a reception information bit string corresponding to the information bit string supplied to the input terminal 11 is developed at the output terminal 27. If on the other hand the reception signal is an undesirable wave, then a meaningless information bit string is developed at the output terminal 27 because the reception signal is multiplied with the phase data. Specifically, the meaningful non-desired wave is made meaningless and can be discriminated from the desired wave. Accordingly, it is possible to determine on the basis of the meaningless information bit string that the reception signal is the non-desired wave.

According to this embodiment, the reception signal, processed by the complex conjugate multiplication by the multiplier 21, is supplied to a phase judgement circuit 28. It can be determined by the phase judgement circuit 28 whether or not the phase of the signal is any of the phases (any of the phases shown in FIG. 2A) provided by the DQPSK modulation. When the transmission signal is transmitted under being modulated by the DQPSK modulation, the phase of the transmission signal should be any of the four phases shown in FIG. 2A. According to the present invention, since the phase data generated based on the already-known random number of M series is multiplied with the transmission signal by the multiplier 13, the phase of the transmission signal is finely changed from the values of the four phases and the phase is changed as shown in FIG. 2B, for example.

On the reception side, the transmission signal with the original four phase values can be obtained by the complex conjugate multiplication of the same data. Therefore, if the random numbers used in the processings on the transmission side and the reception side become equal to each other, then the transmission data can be recovered on the reception side and correct reception information bits can be obtained at the output terminal 27. Then, if it is detected by the phase judgement circuit 28 that the phase of the signal output from the multiplier 21 is changed in the four phases shown in FIG. 2A, then it can be judged that a signal to be received (i.e., desired wave) can be received. If there are other phases as shown in FIG. 2B, then it can be judged that other signal wave than the desired wave is received on the reception side. Since the phase judgement circuit 28 can determine whether or not the desired wave is received, the communication control unit (not shown) need not judge the contents of the received data and it can be easily determined by the identification code contained in the received information bits output at the output terminal 27 whether or not the desired wave is received.

When it is intended to determine only whether or not the desired wave is received, the received signal need not be demodulated and decoded. As a result, the demodulator 26 and the circuit connected to the rear stage of the demodulator 26 need not be operated. Therefore, it can be determined by less circuits whether or not the desired wave is received. Also, it can be rapidly determined by less circuits whether or not the desired wave is received.

Figure 3:
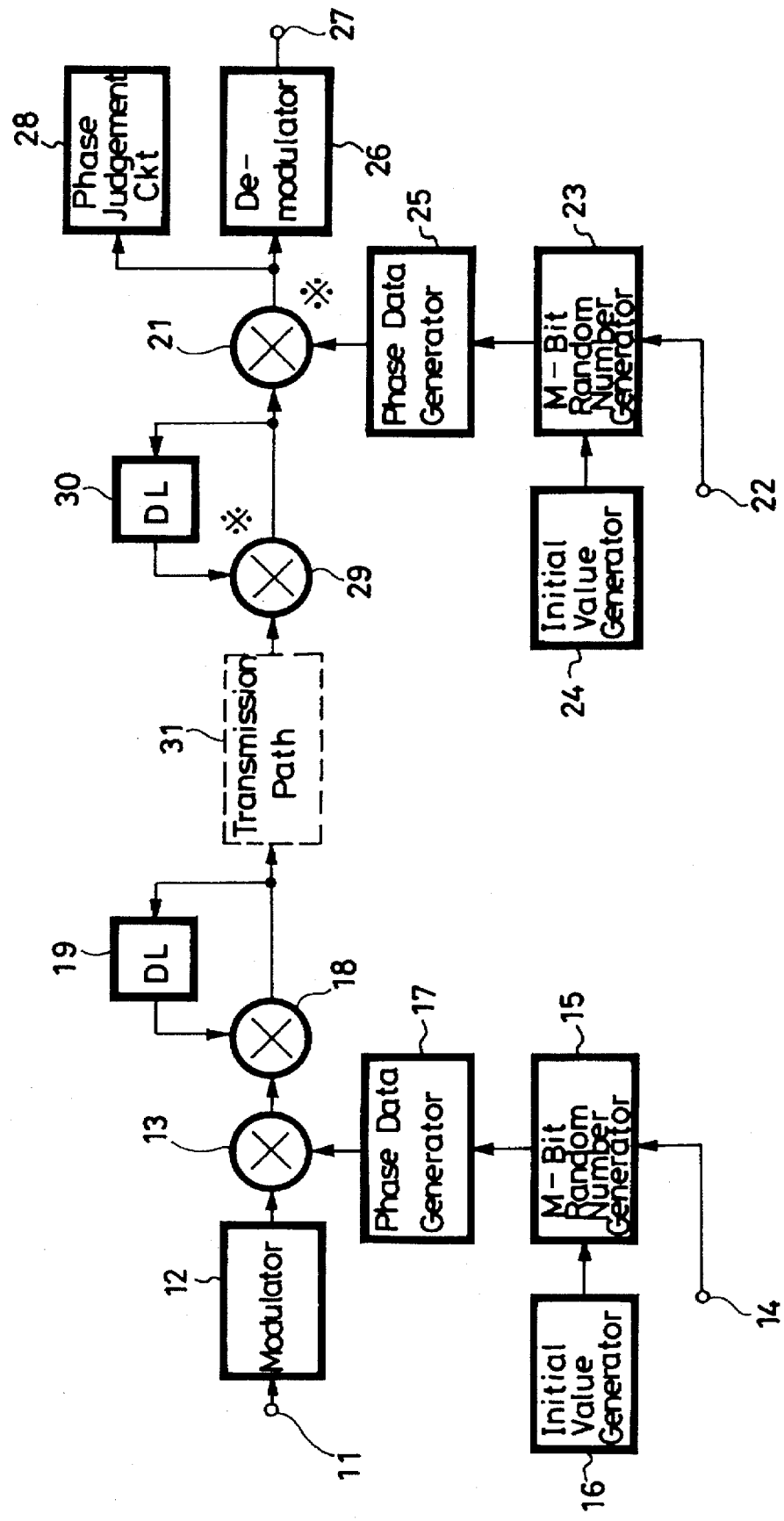
FIG. 3 is a block diagram showing a signal transmission system according to a second embodiment of the present invention.

A signal communication system according to another embodiment of the present invention will be described with reference to FIG. 3. In FIG. 3, similar elements and parts corresponding to those of FIG. 1 which shows the first embodiment are marked with the same reference numerals and therefore need not be described in detail.

According to this embodiment, as shown in FIG. 3, a transmission signal output from the multiplier 13 on the transmission side is supplied to the multiplier 18. The multiplier 18 multiplies the transmission signal with a signal which results from delaying the multiplied output by a delay circuit (DL) 19. In this case, the delay circuit 19 delays the transmission signal by one sample. A multiplied output of the multiplier 18 is transmitted to the transmission path 31 side. If necessary, a transmission processing such as frequency conversion is carried out.

On the reception side, the signal received through the transmission path is processed by a reception processing such as frequency conversion and then supplied to the multiplier 29. A multiplied output from the multiplier 29 is delayed by a delay circuit (DL) 30 and fed back to the multiplier 20, wherein the returned signal and the reception signal are multiplied with each other in a complex conjugate multiplication fashion. In this case, the delay circuit 30 delays the reception signal by a delay time of one sample. Then, the multiplied output of the multiplier 20 is supplied to the multiplier 21.

The rest of the arrangement is formed similarly to the first embodiment shown in FIG. 1.

According to the second embodiment, the transmission signal is converted into a differential signal by the multiplier 18 and the delay circuit 19. This differential signal is transmitted through the transmission path 31 to the reception side. Depending on the state of the transmission path 31, if the transmission signal is transmitted in the form of the differential signal, then the transmission signal can be transmitted more satisfactorily.

Also in accordance with the second embodiment, similarly to the first embodiment, since the transmission signal is multiplied with the phase data generated based on the already-known random number of the M series and then transmitted, similar effects to those of the first embodiment can be achieved. Accordingly, it can be easily determined by the phase judgement circuit 28 whether or not the reception signal is the desired wave.

While the present invention is applied to the communication system for transmitting a transmission signal modulated by the DQPSK modulation, a principle of the present invention can of course be applied to transmission systems for transmitting a transmission signal modulated by other modulation systems.

According to the present invention, since the transmission signal is multiplied with the phase data generated based on the already-known random number at a predetermined timing and transmitted to the transmission line and the reception signal is multiplied with the phase data generated based on the already-known random number at a predetermined timing and then demodulated, if the random number used in the transmission side is equal to the random number used in the reception side, then transmission information can be correctly demodulated and decoded on the reception side and only the information contained in the desired wave can be extracted by the reception side.

In this case, the phase modulation is carried out as a modulation in order to obtain the transmission signal and the phase demodulation is carried out in order to demodulate the reception signal, whereby the transmission signal to be transmitted is phase-shifted by the multiplication of the phase data based on the random number and phase-shifted by modulation. Thus, the modulated wave can be scrambled by the phase-shift by multiplication of the phase data based on the random number.

Further, since a transmission signal is differentially modulated upon transmission and a reception signal is differentially demodulated upon reception, the transmission signal multiplied with the phase data based on the random number can be transmitted satisfactorily as the differential signal.

Furthermore, since it can be determined that the desired wave is received if the phase of the signal, which results from phase-demodulating the multiplied signal on the reception side, is located at the predetermined phase position, it can be easily determined whether or not the desired wave is received. Accordingly, it becomes unnecessary to judge the identification code by energizing the circuit which decodes received data. As a result, it becomes possible to determine by the simplified circuit whether or not the desired wave is received.

Having described preferred embodiments of the invention with reference to the accompanying drawings, it is to be understood that the invention is not limited to those precise embodiments and the various changes and modifications could be effected therein by one skilled in the art without departing from the spirit or scope of the invention as defined in the appended claims.

What is claimed is:

1. A signal communication method comprising the steps of:

generating a modulated signal by modulating an input information signal;

generating a first multiplied signal by multiplying said modulated signal with phase data generated by a first phase data generator based on a known random number at a predetermined timing;

transmitting said first multiplied signal;

receiving said first multiplied signal as a reception signal;

generating a second multiplied signal by multiplying said reception signal with phase data generated by a second phase data generator based on said known random number at a timing synchronized with said predetermined timing; and recognizing based on a phase of said second multiplied signal whether said input information signal is a reception desired signal before decoding said reception signal, thereby reducing a number of steps needed to recognize said input information signal as said reception desired signal.

2. The signal communication method according to claim 1, further comprising the steps of:

generating said modulated signal by phase-modulating said input information signal;

phase-demodulating said second multiplied signal; and recognizing based on said demodulated signal whether said input information signal is said reception desired signal.

3. The signal communication method according to claim 1, further comprising the steps of:

generating said modulated signal by phase-modulating said input information signal; and recognizing based on a phase detected result of said second multiplied signal whether said input information signal is said reception desired signal.

4. The signal communication method according to claim 1, further comprising the steps of:

differentially modulating said first multiplied signal;

transmitting said differentially modulated signal; and differentially demodulating said reception signal.

5. A signal communication system comprising:

modulating means for modulating an input information signal;

first phase data generating means for generating phase data based on a known random number at a predetermined timing;

first multiplying means for generating a first multiplied signal by multiplying said modulated input information signal with said phase data from said first phase data generating means;

transmitting means for transmitting said first multiplied signal;

receiving means for receiving said first multiplied signal as a reception signal;

second phase data generating means for generating phase data based on said known random number at a timing synchronized with said predetermined timing;

second multiplying means for generating a second multiplied signal by multiplying said reception signal received by said receiving means with said phase data from said second phase data generating means; and recognizing means for recognizing based on said second multiplied signal whether said input information signal is a reception desired signal before decoding said reception signal, whereby a number of circuits for recognizing said input information signal as said reception desired signal is reduced.

6. The signal communication system according to claim 5, wherein said modulating means is a phase modulator and said recognizing means is a phase demodulator.

7. The signal communication system according to claim 5, wherein said modulating means is a phase modulator and said recognizing means performs recognition based on a phase of said second multiplied signal.

8. The signal communication system according to claim 5, further comprising:

first differential modulating means connected to a rear stage of said first multiplying means for differentially modulating said first multiplied signal; and second differential modulating means connected to a front stage of said second multiplying means for differentially modulating said reception signal.

* * * * *